March 19, 1935.  W. H. MASON  1,995,264
COMPOSITE STRUCTURAL UNIT
Filed Nov. 3, 1931
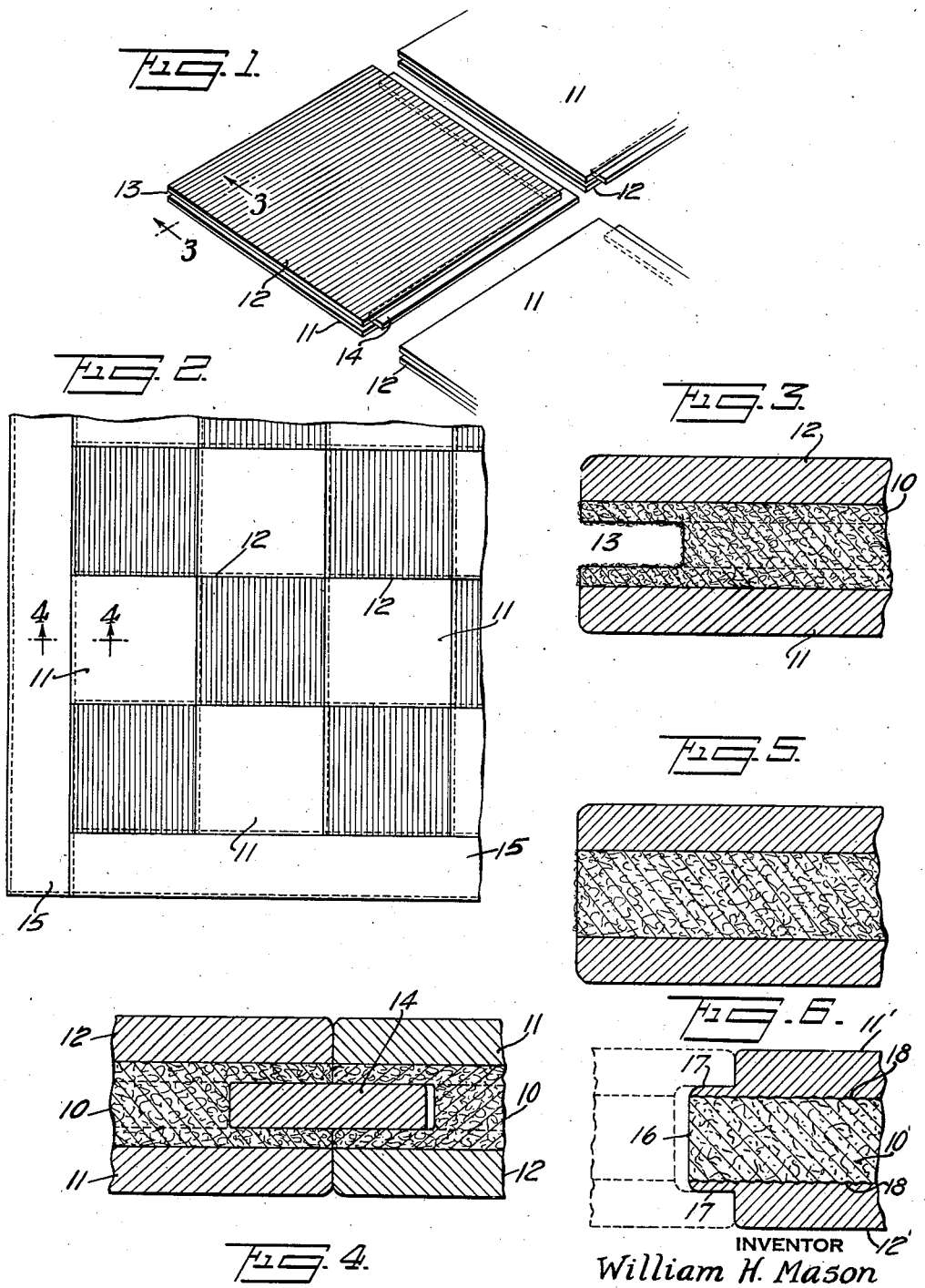
INVENTOR
William H. Mason
BY
Dyke and Schaines
ATTORNEYS Patented Mar. 19, 1935

1,995,264

UNITED STATES PATENT OFFICE 1,995,264

COMPOSITE STRUCTURAL UNIT

William H. Mason, Laurel, Miss., assignor to Masonite Corporation, Laurel, Miss., a corporation of Delaware Application November 3, 1931, Serial No. 572,756

1 Claim. (Cl. 20—7)

My invention relates to composite units for structural purposes, as for example, parquetry and tile floor and wall construction, panelling, etc. The preferred material used in the manufacture of such units is fibrous board, preferably ligno-cellulose fiber board.

The exterior or exposed surface of such units, especially when used as flooring, is subjected to wear, and should, therefore, be of hard, dense material, having a high degree of wear and water resistance. A suitable ligno-cellulose fiber board is disclosed and claimed in U. S. Letters Patent No. 1,663,505, granted to me on March 20th, 1928. However, the desired qualities mentioned are greatly increased by treatment of the board just mentioned to cause it to absorb a drying oil, for example, China wood oil or tung oil, followed by baking to polymerize or set the oil. The preferred material for the exterior layer or layers of the composite unit is the board of said patent, No. 1,663,505, either strengthened by drying oil or not, although any fibrous board of suitable strength, hardness and durability may be employed.

Hard boards of the character mentioned are substantially non-porous and non-yielding, and hence, have very little cushioning action, sound absorbing and heat insulating properties.

In order to obtain a structural unit suitable for use as flooring, it is highly desirable that the hard surface board be combined with suitable cushioning means. This effect is brought about by uniting with an outer layer or layers of hard board a base or core of highly porous vegetable fiber board which is strong and durable and possessed of sufficient resilience to enable it to act as a cushion. Many types of board of this character are on the market and are known as insulation boards. I prefer, however, to use for this purpose the board disclosed and claimed in U. S. Letters Patent No. 1,663,504, granted to me on March 20th, 1928. Such insulation boards may be of suitable density to enable them to withstand heavy loads or shocks, as when used in factory flooring. The density may vary, for example, from a specific gravity of 0.3 to a specific gravity of 0.8. When the floor has been laid, the upper or surfacing layer, by reason of its stiffness and density, distributes over a considerable area of the cushioning layer all concentrated loads or stresses, to thereby avoid overloading and crushing of such cushioning layer and indenting of the surfacing layer.

Insulation boards offer considerable resistance to the flow of heat and are highly sound absorbent. A composite board formed as described is not only sufficiently elastic and resilient to make a good floor even when laid upon an unyielding base, such as cement, but is also highly resistant to passage of sound waves and flow of heat.

An insulation board may be united to a single layer of hard board to form a composite unit, one surface of which is exceedingly hard, dense and strong, and the other highly porous, sound absorbent and resistant to flow of heat. Such a unit is useful for a number of purposes, for example, as armored thermal insulation and for cab tops, etc.

When used for the latter purpose, the hard board forms the outer layer, well adapted to receive priming and finishing coats of paint, enamel, varnish, etc., and constituting an exceedingly hard and durable protective layer. The inner layer of insulation board, by reason of its sound-absorptive qualities, deadens the sound of the motor within the body of the cab or vehicle, and also aids in retaining heat within the body. Various other advantages of the composite structure will be apparent.

Reference is hereby made to the accompanying drawing, of which

Figure 1 is an isometric view showing a complete unit with portions of other units adjacent thereto;

Fig. 2 is a plan view of an assembly of units;

Fig. 3 is an enlarged section on line 3—3 of Fig. 1;

Fig. 4 is an enlarged section on line 4—4 of Fig. 2;

Fig. 5 is a view similar to Fig. 3 of a modified structure suitable for use as a tile; and Fig. 6 is a view similar to Fig. 3 of a second modification.

The units of Figs. 1 to 4 each comprise an inner layer, body, or core 10 of insulation board and outer protective layers 11 and 12 of hard board, said insulation and hard boards having the properties hereinbefore described, that is, the board 10 is porous, yielding, and resilient to enable it to act as a cushion and as sound and heat insulation means. The layers 11 and 12 are of material which is exceedingly hard, dense, strong and coherent, and highly resistant to wear and to water absorption.

The layers 11 and 12, may, if desired, be identical, but I prefer to make them of boards having the same physical characteristics except color, for example, the boards 11 may have the natural color of the material, as a medium brown and the boards 12 may be of the same material with the addition thereto of color to produce a dark brown. Such color is preferably incorporated with the fibrous material by being incorporated into the same while in pulp form, or in form of partially dewatered sheets. When so applied, the color extends entirely through the thickness of the board and therefore the board retains its color even after its outer surface has become worn.

A groove, 13, is formed in each of the edges of the unit, the width of the groove being, by preference, less than the thickness of the board 10, so that when two units are united by a spline 14, as shown in Fig. 4, there is a substantial amount of cushioning material between the upper and lower surfaces of the spline and the hard boards 11 and 12.

The splines 14 are of hard material, preferably the same as the boards 11 and 12, and may be made from trimmings thereof. These splines occupy the grooves along two adjacent edges of the unit, as in Fig. 1. They are quickly and easily secured in position by applying glue to one edge of the spline and inserting it into the groove so as to press against, or contact with, the bottom of the groove as the glue hardens.

It is a decided advantage to construct the unit with outer layers 11 and 12 of different color, as it permits the user to lay a floor of a single color, which may be that of either of said layers, or, if desired, to lay a floor having a pattern of at least two different colors, as in Fig. 2.

In order to vary and increase the number of the patterns which may be formed, the invention includes not only square units, but also such as are not square, as for instance, elongated strips 15, as shown in Fig. 2. Such strips are preferably formed with the grooves provided with splines to adapt them to be joined to other elongated units and/or to square units, as shown. These units are of any desired length.

When the floor of interlocking units is laid down without being nailed, cemented, or otherwise fastened to an underfloor, it can readily be taken up in whole or in part and new patterns obtained on relaying; any worn or soiled units can be reversed or moved under furniture and other changes made as desired. Springs or wedges may be inserted at the edges and particularly at the last laid edge, for holding the units snugly together or, if desired, a stop piece such as a quarter-round, may be nailed to the base to overlie the floor and any springs or wedges, and hold the floor in place by its edges. In such case, the floor, being free from other fastenings, can be taken up, removed, relaid, etc., by taking up a quarter-round along one edge only, the units being slid in or out under the quarter-round stops along the other edges of the floor.

Various methods may be adopted for the manufacture of the structural units, as for example: A board of insulating material suitable to form the core 10 and of suitable dimensions is coated with waterproof glue, such as casein glue, and is clamped or pressed between hard boards suitable to form the outer layers 11 and 12, and of suitable dimensions, until the glue is set. Before the gluing operation, each of the three boards is brought to gauge thickness by passing the same through a suitable planer. The composite board thereby formed may have a thickness of ½", each of the hard boards being ⅛" thick. The composite boards are then cut into units, preferably of square or elongated rectangular configuration, and the edges of such units may be beveled or rounded, as shown.

Each of such units is provided with grooves by means of rotary cutters acting upon the edges of the middle layer of material. The splines 14 are then glued into position, or if desired, the splines may be supplied separately to the user and placed in position with or without glue as the floor is laid.

The unit of Fig. 5 is exactly the same as that of Fig. 3, except that no groove 13 is formed therein. This type of unit may be laid and used in the same manner as ordinary tile.

Although a two-layer unit may be made by omitting the bottom hard board of Fig. 3, or Fig. 5, the three layer construction as shown is preferred, for the reason that in such a unit the bending stresses set up as by the drying of the glue or cement by which the layers are united are balanced and equalized, whereby warping of the units is effectually prevented. A three layer unit as described is much more resistant to warping due to changing moisture conditions than a two layer unit, by reason of the fact that the outer layers are of the same material and balance each other, whereas in a two layer unit, the layers are of different material, and by reason of unequal moisture absorption, the board is caused to warp. It should be noted that the boards 11 and 12 which are characterized by great stiffness and tensile strength are at a substantial distance from the neutral axis of the unit, similar to the flanges of an I beam, whereby very great resistance to flexure is obtained.

The splines 14 and grooves 13 may, if desired, be replaced by equivalent inter-engaging means, as for example, pins or pegs and circular holes to receive the same.

In the device of Fig. 6 the unit is provided along two of its edges with integral tongues composed of a central layer 16 integral with the cushioning layer 10' of the unit and outer layers 17 integral with the hard surfacing layers 11' and 12'. The tongue is stiffened and protected by the layers 17 of hard board and by the glue or cement layers 18 between the layer 16 and the layers 17. This type of unit is provided along two of its edges with central grooves of suitable size to receive tongues formed as shown, as indicated by a fragment of a unit shown in dotted lines, Fig. 6.

I claim:

Flooring units comprising an interior core layer of relatively soft cushioning porous insulation fiber board, and two surface layers of hard dense substantially non-porous composition board made from vegetable fiber and adhesively secured to the surfaces of such inner member, and said surface layers being of hardness and density, strength and stiffness adapted to prevent indentation by concentrated loads and by distributing overload to prevent injury of the core member, said units being provided on certain edges with projecting tongue portions, said tongue portions consisting of a portion of the porous interior layer together with parts of the exterior layers of hard dense material, and said units being provided on certain other edges with grooves for engagement by said tongues of other units, the groove walls being formed by the hard dense portions through complete removal of the edge part of the inner core and partial removal of the hard surface portions.

WILLIAM H. MASON.